(12) United States Patent
Matsumoto

(10) Patent No.: US 10,647,163 B2
(45) Date of Patent: May 12, 2020

(54) STUD PIN AND PNEUMATIC TIRE

(71) Applicant: The Yokohama Rubber Co., LTD., Minato-ku, Tokyo (JP)

(72) Inventor: Kenichi Matsumoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 57 days.

(21) Appl. No.: 15/580,244

(22) PCT Filed: Jun. 7, 2016

(86) PCT No.: PCT/JP2016/066933
§ 371 (c)(1),
(2) Date: Dec. 6, 2017

(87) PCT Pub. No.: WO2016/199767
PCT Pub. Date: Dec. 15, 2016

(65) Prior Publication Data
US 2018/0154704 A1    Jun. 7, 2018

(30) Foreign Application Priority Data
Jun. 12, 2015  (JP) .................. 2015-119692

(51) Int. Cl.
*B60C 11/16*  (2006.01)
(52) U.S. Cl.
CPC ...... B60C 11/1675 (2013.01); *B60C 11/1643* (2013.01); *B60C 11/1693* (2013.01)
(58) Field of Classification Search
CPC .......... B60C 11/1675; B60C 11/1693; B60C 11/1643; B60C 11/1681; B60C 11/1687; B60C 11/16

USPC ................... D12/608; 152/210–212
See application file for complete search history.

(56) References Cited

U.S. PATENT DOCUMENTS

| 3,578,053 A * | 5/1971 | Milliken ................. B60C 11/16 |
| | | 152/210 |
| 2013/0000807 A1* | 1/2013 | Pons .................... B60C 11/1643 |
| | | 152/210 |
| 2016/0159164 A1 | 6/2016 | Matsumoto |

FOREIGN PATENT DOCUMENTS

| EP | 2977231 A1 * | 1/2016 | ......... B60C 11/1643 |
| FI | 1176463 | * 12/1969 | |
| JP | 58129206 U | * 9/1983 | |
| JP | 2013-023110 | 2/2013 | |
| JP | 2014012455 A * | 1/2014 | ......... B60C 11/1656 |
| JP | 2014-180952 | 9/2014 | |
| JP | 2015-058787 | 3/2015 | |
| JP | 2015058787 A * | 3/2015 | ......... B60C 11/1675 |
| KR | 10-2015-0071293 | 6/2015 | |

(Continued)

OTHER PUBLICATIONS

Translation: FI176463; Jaakko Matti Heikkila; (Year: 2019).*

(Continued)

*Primary Examiner* — Kendra Ly
(74) *Attorney, Agent, or Firm* — Thorpe North & Western

(57) ABSTRACT

A stud pin and a pneumatic tire are provided. A tip portion of the stud pin includes an end surface with a concave polygonal profile shape including one recessed portion and one protrusion portion on a side opposite the recessed portion. The stud pin is mounted in a stud pin installation hole with the protrusion portion facing a leading side in a tire circumferential direction and the recessed portion face a trailing side.

18 Claims, 6 Drawing Sheets

(56) References Cited

FOREIGN PATENT DOCUMENTS

| WO | WO 2009/068744 | 6/2009 | |
|----|----------------|--------|---|
| WO | WO 2014/122570 | 8/2014 | |
| WO | WO 2014/148262 | 9/2014 | |
| WO | WO-2014148262 A1 * | 9/2014 | ......... B60C 11/1643 |
| WO | WO 2015/012070 | 1/2015 | |

OTHER PUBLICATIONS

Machine Translation: JP-2014012455-A; Sawada Hiroki; (Year: 2019).*
Machine Translation: JP-58129206-U; (Year: 2019).*
Machine Translation: JP-2015058787-A; Yasunaga Tomokazu; (Year: 2019).*
International Search Report for International Application No. PCT/JP2016/066933 dated Sep. 13, 2016, 4 pages, Japan.

* cited by examiner

STUD PIN AND PNEUMATIC TIRE

TECHNICAL FIELD

The present technology relates to a stud pin mountable in a tread portion and a pneumatic tire mounted with the stud pin.

BACKGROUND ART

Conventional snow tires provide grip on icy road surfaces via stud pins mounted in a tread portion of the tire.

Typical stud pins are embedded in a stud pin installation hole provided in the tread portion. When stud pins are embedded in a stud pin installation hole, the stud pin installation hole has an expanded diameter. This firmly embeds the stud pin in the stud pin installation hole. As a result, stud pins are prevented from falling out from the stud pin installation hole upon receiving forces upon breaking or accelerating or lateral forces from the road surface when the tire rolls.

The stud pin is provided with a buried base portion, and a tip portion that projects beyond an end surface of the buried base portion. The buried base portion is embedded in the stud pin installation hole formed in the tread surface of the tire so that the tip portion projects from the tread surface.

The edges of the tip portion of the stud pin come into contact with the icy road surface, providing an edge effect that provides a high gripping force. Accordingly, effort has been made towards increasing the edge effect by providing the tip portion with more edges that come into contact with the icy road surface.

A stud pin is known that includes a tip portion with a concave polygonal end surface and a recessed portion in a side surface for increasing the edges of the tip portion (for example, see International Patent Application Publication No. WO 2014/122570). Additionally, effort has been made towards increasing the edges and thus increasing the edge effect by making the tip portion larger.

However, when a tire mounted with a stud pin that has a concave polygonal end surface runs on icy road surfaces, ice shaved by the tip portion when the tire is driven builds up in the recessed portion of the tip portion. A build-up of fine ice particles in the recessed portion may reduce the ability of the tip portion to break up ice when the tire is driven, and thus reduce driving performance.

However, increasing the edges of the tip portion results in an increase in the amount of wear of the road surface when running on a non-icy road surface.

SUMMARY

The present technology provides a stud pin and a pneumatic tire that can provide a reduced amount of wear of road surfaces when running on non-icy road surfaces while maintaining a good driving performance on icy road surfaces.

One aspect of the present technology is a stud pin mountable in a stud pin installation hole of a tread portion of a pneumatic tire, the stud pin comprising:

a buried base portion configured to be embedded in the stud pin installation hole that extends in a tire radial direction; and a tip portion configured to project from a road contact surface of the tread portion when the buried base portion is embedded in the stud pin installation hole, the tip portion comprising an end surface with a concave polygonal profile shape comprising one first recessed portion and one first protrusion portion on an end portion on a side opposite the first recessed portion; and the first protrusion portion being configured to face a leading side in a tire circumferential direction and the first recessed portion being configured to face a trailing side when the stud pin is mounted in the stud pin installation hole.

The first protrusion portion preferably has an interior angle greater than 90 degrees and less than 180 degrees.

The first recessed portion preferably has an interior angle greater than 270 degrees and less than 360 degrees.

The first recessed portion is preferably formed by an adjacent pair of first recessed portion sides.

$1.0 \le L1/L2 \le 5.0$ is preferably satisfied, where L1 is a distance from a corner of the first protrusion portion to a corner of the first recessed portion, and L2 is a distance from a straight line that connects end points of the pair of first recessed portion sides on a side opposite the corner of the first recessed portion to the corner of the first recessed portion.

An end surface of the buried base portion where the tip portion is provided preferably has a concave polygonal profile shape comprising one second recessed portion and one second protrusion portion on a side opposite the second recessed portion; and the second protrusion portion preferably faces the leading side in the tire circumferential direction and the second recessed portion faces the trailing side.

The second recessed portion is preferably formed by an adjacent pair of second recessed portion sides; and $1.0 \le L1'/L2' \le 5.0$ is preferably satisfied, where L1' is a distance from a corner of the second protrusion portion to a corner of the second recessed portion, and L2' is a distance from a straight line that connects end points of the pair of second recessed portion sides on a side opposite the corner of the second recessed portion to the corner of the second recessed portion.

Another aspect of the present technology is a pneumatic tire with a designated rotation direction, comprising:

a stud pin mounted in a stud pin installation hole of a tread portion;

the stud pin comprising:

a buried base portion embedded in the stud pin installation hole that extends in a tire radial direction; and a tip portion that projects from a road contact surface of the tread portion when the buried base portion is embedded in the stud pin installation hole, the tip portion comprising an end surface with a concave polygonal profile shape comprising one first recessed portion and one first protrusion portion on an end portion on a side opposite the first recessed portion; and the stud pin being disposed with the first protrusion portion facing a leading side in a tire circumferential direction and the first recessed portion facing a trailing side.

The first protrusion portion preferably has an interior angle greater than 90 degrees and less than 180 degrees.

The first recessed portion preferably has an interior angle greater than 270 degrees and less than 360 degrees.

The first recessed portion is preferably formed by an adjacent pair of first recessed portion sides.

$1.0 \le L1/L2 \le 5.0$ is preferably satisfied, where L1 is a distance from a corner of the first protrusion portion to a corner of the first recessed portion, and L2 is a distance from a straight line that connects end points of the pair of first recessed portion sides on a side opposite the corner of the first recessed portion to the corner of the first recessed portion.

An end surface of the buried base portion where the tip portion is provided preferably has a concave polygonal profile shape comprising one second recessed portion and one second protrusion portion on a side opposite the second recessed portion; and the second protrusion portion preferably faces the leading side in the tire circumferential direction and the second recessed portion faces the trailing side.

The second recessed portion is preferably formed by an adjacent pair of second recessed portion sides; and $1.0 \leq L1'/L2' \leq 5.0$ is preferably satisfied, where L1' is a distance from a corner of the second protrusion portion to a corner of the second recessed portion, and L2' is a distance from a straight line that connects end points of the pair of second recessed portion sides on a side opposite the corner of the second recessed portion to the corner of the second recessed portion.

According to the aspects described above, by the stud pin being installed in the tire with protrusion portion facing the leading side when the tire rolls on icy road surfaces, the protrusion portion bites into the ice on the icy road surface and breaks it up. As a result, a sufficient mechanical breaking effect against the ice on the icy road surface can be obtained. Accordingly, friction on the icy road surface can be increased, and driving performance can be increased by ensuring kickoff.

Additionally, by the stud pin being installed in the tire with the recessed portion facing the trailing side, broken up ice collects in the recessed portion upon braking on the icy road surface and is compacted. The compacted broken up ice comes into contact with the ice on the icy road surface and digs into the ice. Thus, braking performance on ice can be increased. Upon braking on non-icy road surfaces, only the end portion of the recessed portion comes into contact with the road surface. Thus, wear of non-icy road surfaces can be reduced.

BRIEF DESCRIPTION OF DRAWINGS

FIG. 4 is a plan view illustrating the shape of an end surface 60a.

DETAILED DESCRIPTION

Figure 1:
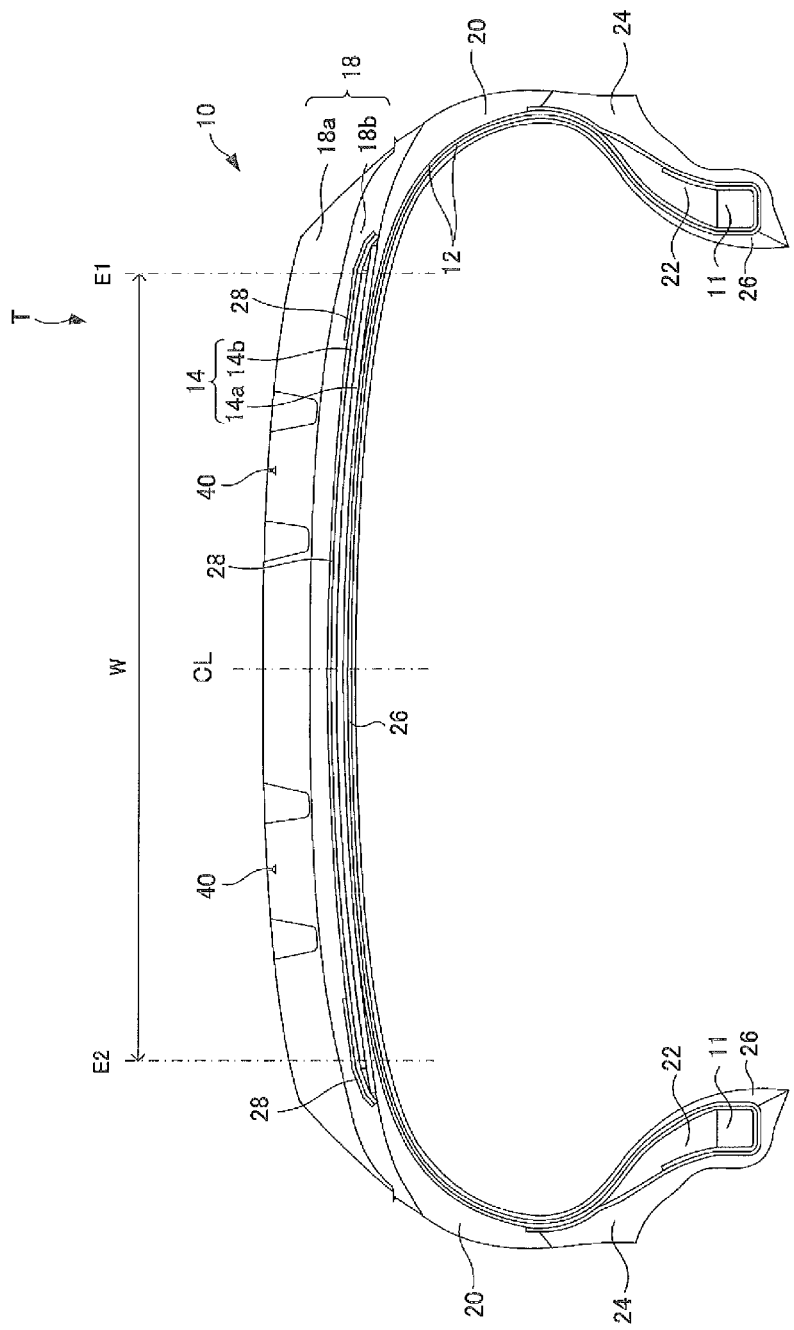
FIG. 1 is a tire cross-sectional view illustrating a cross section of a pneumatic tire of an embodiment.

Embodiments of the present technology are described in detail below with reference to the drawings.
First Embodiment
Overall Description of the Tire Below, a pneumatic tire of the present embodiment is described. FIG. 1 is a tire cross-sectional view illustrating a cross section of a pneumatic tire (hereinafter referred to as "tire") 10 of the present embodiment.

The tire 10 is, for example, a tire for a passenger vehicle. A tire for a passenger vehicle refers to a tire defined according to Chapter A of the JATMA Yearbook 2012 (standards of The Japan Automobile Tyre Manufacturers Association, Inc.). The tire 10 can also be a small truck tire as defined in Chapter B or a truck tire or bus tire as defined in Chapter C.

Below, values of the dimensions of various pattern elements are described in detail as example values for a tire for a passenger vehicle. However, the pneumatic tire of the present technology is not limited to these example values.

"Tire circumferential direction" described below refers to the direction (both directions) in which the tread surface rotates when the tire 10 rotates about the tire rotation axis. "Tire radial direction" refers to the direction that extends radially orthogonal to the tire rotation axis. "Outward in the tire radial direction" refers to the direction away from the tire rotation axis in the tire radial direction. "Tire lateral direction" refers to the direction parallel with the tire rotation axis direction. "Outward in the tire lateral direction" refers to the directions away from the center line CL of the tire 10.
Tire Structure The tire 10 mainly includes a pair of bead cores 11, a carcass ply layer 12, and a belt layer 14 as framework members, and a tread rubber member 18, side rubber members 20, bead filler rubber members 22, rim cushion rubber members 24, and an innerliner rubber member 26 around the framework members.

The pair of bead cores 11 are annular members disposed at the end portions in the tire lateral direction, inward in the tire radial direction.

The carcass ply layer 12 includes one or more carcass ply members which are made of organic fibers covered with rubber. The carcass ply members extend between and around the pair of bead cores 11 to form a toroidal shape.

The belt layer 14 includes a plurality of belt members 14a, 14b. The belt layer 14 is disposed outward of the carcass ply layer 12 in the tire radial direction and is wound in the tire circumferential direction. The inner belt member 14a in the tire radial direction has a width in the tire lateral direction greater than the width of the outer belt member 14b in the tire radial direction.

The belt members 14a, 14b are members made of steel cords covered with rubber. The steel cords of the belt members 14a, 14b are disposed inclined at a predetermined angle of from, for example, 20 to 30 degrees, with respect to the tire circumferential direction. The steel cords of the belt members 14a, 14b are inclined in opposite directions with respect to the tire circumferential direction and cross one another. The belt layer 14 suppresses expansion of the carcass ply layer 12 caused by the pressure of the air in the tire 10.

The tread rubber member 18 is disposed outward of the belt layer 14 in the tire radial direction. The sidewall rubber members 20 are connected to both end portions of the tread rubber member 18. The tread rubber member 18 is made of two layers, an upper tread rubber member 18a disposed outward in the tire radial direction and a lower tread rubber member 18b disposed inward in the tire radial direction. The upper tread rubber member 18a is provided with circumferential grooves, lug grooves, and stud pin installation holes 40.

A region (information display region) where information on the tire such as the rotation direction, size, model, markings, and country of manufacture is provided on the outer surface of the side rubber member 20 in the tire lateral direction.

The rim cushion rubber members 24 are provided at inner ends of the side rubber members 20 in the tire radial direction. The rim cushion rubber members 24 come into contact with the rim on which the tire 10 is mounted. The bead filler rubber members 22 are disposed outward of the bead core 11 in the tire radial direction so as to be interposed between the carcass ply layer 12 wound around the bead core 11. The innerliner rubber member 26 is provided on the inner surface of the tire 10 facing a tire cavity region that is filled with air and is surrounded by the tire 10 and the rim.

In addition, the tire 10 is provided with a belt cover layer 28 that covers the outer surface of the belt layer 14 in the tire radial direction. The belt cover layer 28 is made of organic fibers covered with rubber.

The tire 10 has the tire structure illustrated in FIG. 1. However, the pneumatic tire of the present technology is not limited to this structure.

Stud Pin

Figure 2:
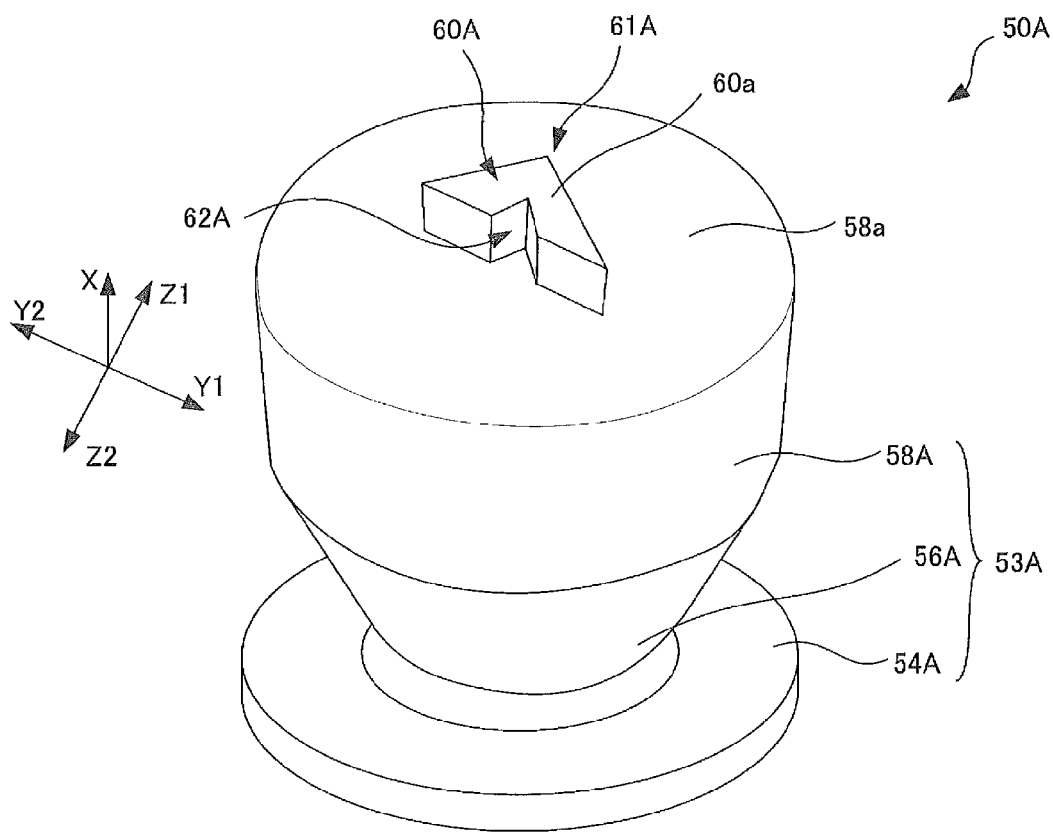
FIG. 2 is an external perspective view illustrating a stud pin 50A of the first embodiment of the present technology.
Figure 3:
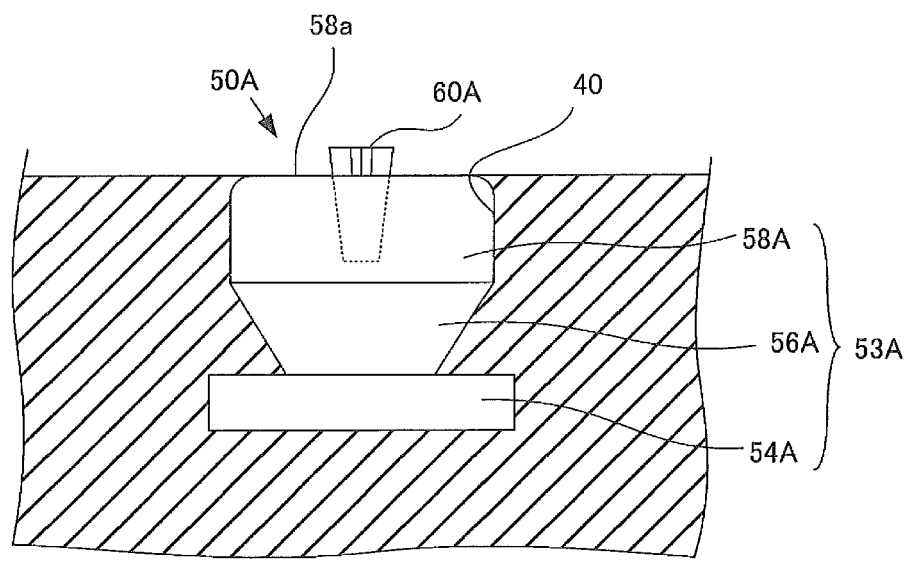
FIG. 3 is a side view illustrating the stud pin 50A mounted in a tread portion.

FIG. 2 is an external perspective view illustrating a stud pin 50A of the first embodiment of the present technology. FIG. 3 is a side view illustrating the stud pin 50A mounted in the stud pin installation hole 40 provided in the tread rubber member 18 of a tread portion T (see FIG. 1).

The stud pin 50A mainly includes a buried base portion 53A and a tip portion 60A. The buried base portion 53A is embedded in the stud pin installation hole 40 of the pneumatic tire to be mounted. The stud pin 50A is secured in the tread portion T by the buried base portion 53A being pressed by the tread rubber member 18 via the side surface of the stud pin installation hole 40. The stud pin 50A includes the buried base portion 53A and the tip portion 60A, and the buried base portion 53A and the tip portion 60A are formed in this order in the X-direction. Note that the X-direction corresponds to the extension direction (length direction) of the buried base portion 53A toward the tip portion 60A, and the normal line direction relative to the tread surface of the tread portion T when the stud pin 50A is mounted in the stud pin installation hole 40. Additionally, the Y1- and Y2-directions correspond to the tire lateral direction, and the Z1- and Z2-directions correspond to the tire circumferential direction. In the tire 10 according to the present embodiment, the rotation direction is specified in the information display region provided on the outer surface of the side rubber member 20 in the tire lateral direction. Z1-direction is the rotation direction of the tire 10 when a vehicle mounted with the tire 10 moves forward, and Z2-direction is the rotation direction of the tire 10 when the vehicle moves backward. In other words, the side in the Z1-direction is the leading side and the side in the Z2-direction is the trailing side.

The buried base portion 53A includes a bottom portion 54A, a shank portion 56A, and a body portion 58A. The bottom portion 54A, the shank portion 56A, and the body portion 58A are formed in this order in the X-direction.

The bottom portion 54A is located on an end portion opposite the tip portion 60A. The bottom portion 54A is a flange and prevents rotation of the stud pin 50A in the stud pin installation hole 40 when the stud pin 50A receives forces from the road surface.

The shank portion 56A is the portion that connects the body portion 58A to the bottom portion 54A. The shank portion 56A has a trapezoidal shape with a diameter less than the maximum outer diameter of the bottom portion 54A and that of the body portion 58A. As a result, the shank portion 56A is formed as a recessed portion relative to the body portion 58A and the bottom portion 54A, and the bottom portion 54A and the body portion 58A are formed like flanges.

The body portion 58A has a cylindrical shape and is located between the shank portion 56A and the tip portion 60A and is the flange portion connected to the tip portion 60A. The body portion 58A is embedded in the tread rubber member 18, with the upper end surface 58a of the body portion 58A being exposed, substantially flush with the tread surface when the stud pin 50A is mounted in the tire 10.

The tip portion 60A is the portion that, as illustrated in FIG. 3, projects past the tread surface when mounted in the tread portion T, comes into contact with the road surface, and claws into the ice. The tip portion 60A is the portion that projects from the upper end surface of the buried base portion 53A with concave polygonal column-like shape. In the present embodiment, the tip of the tip portion 60A (end portion in the X-direction) is formed as an end surface 60a that is perpendicular with respect to the extension direction of the buried base portion 53A (X-direction of FIG. 2).

The tip portion 60A may be made of the same metal material as that of the buried base portion 53A or of different metal materials. For example, the buried base portion 53A and the tip portion 60A may be made of aluminum. Additionally, the buried base portion 53A may be made of aluminum, and the tip portion 60A may be made of tungsten. In embodiments in which the buried base portion 53A and the tip portion 60A are made of different metal materials, for example, the tip portion 60A can fixed to the buried base portion 53A by engaging the two by inserting the tip portion 60A into a non-illustrated hole formed in the upper end surface 58a of the body portion 58A of the buried base portion 53A.

Figure 4:
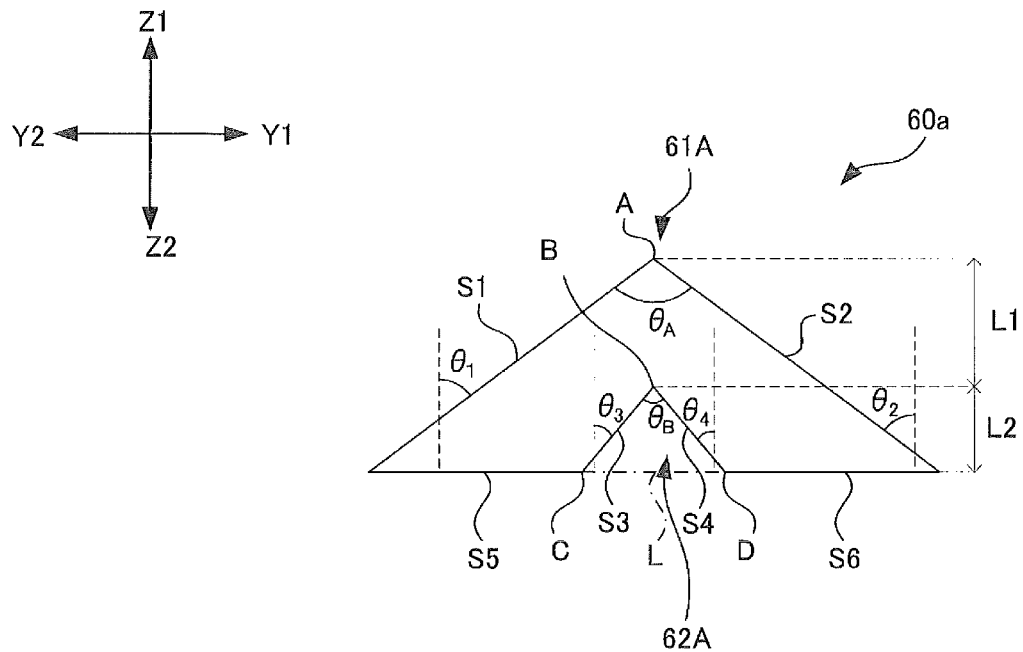

FIG. 4 is a plan view illustrating the shape of the end surface 60a. As illustrated in FIG. 4, the end surface 60a is a concave polygonal shape, and the length in the tire lateral direction Y1, Y2 is preferably greater than the length in the tire circumferential direction Z1, Z2. The stud pin 50A is mounted in the stud pin installation hole 40 of the tire 10 in a manner such that the horizontal direction of FIG. 4 is the tire lateral direction Y1, Y2, and the vertical direction of FIG. 4 is the tire circumferential direction Z1, Z2.

The profile shape of the end surface 60a preferably includes a pair of protrusion portion sides (first protrusion portion sides) S1, S2, and a pair of recessed portion sides (first recessed portion sides) S3, S4. The profile shape of the end surface 60a is preferably an isosceles triangle of the pair of first protrusion portion sides S1, S2 with an isosceles triangular first recessed portion formed on two sides by the pair of first recessed portion sides S3, S4 extracted.

The pair of protrusion portion sides S1, S2 are adjacent to one another and form a protrusion portion (first protrusion portion) 61A at the end portion of the end surface 60a in the Z1-direction. The protrusion portion side S1 extends from a corner A of the protrusion portion 61A in the Y2-direction and the Z2-direction. The protrusion portion side S2 extends from the corner A of the protrusion portion 61A in the Y1-direction and the Z2-direction. An interior angle $\theta_A$ formed by the pair of protrusion portion sides S1, S2 at the protrusion portion 61A is less than 180 degrees. The interior angle $\theta_A$ is preferably greater than 90 degrees and more preferably ranges from 110 degrees to 160 degrees, as described below.

The pair of recessed portion sides S3, S4 are adjacent to one another and form a recessed portion (first recessed portion) 62A at the end portion of the end surface 60a in the Z2-direction. The recessed portion 62A is a triangular region formed by a line segment L that connects the end points of the pair of recessed portion sides S3, S4 in the Z2-direction (a line segment that connects a corner C, which is formed by the recessed portion side S3 and a side S5, and a corner D, which is formed by the recessed portion side S4 and a side S6) and the pair of recessed portion sides S3, S4. The recessed portion side S3 extends from a corner B of the recessed portion 62A in the Y2-direction and the Z2-direction. The recessed portion side S4 extends from a corner B of the recessed portion 62A in the Y1-direction and the Z2-direction. The profile shape of the end surface 60a has an interior angle at a corner B of the recessed portion 62A that is greater than 180 degrees and less than 360 degrees. In other words, an interior angle $(360°-\theta_B)$ formed by the pair of recessed portion sides S3, S4 of the recessed portion 62A is greater than 180 degrees. The interior angle $(360°-\theta_B)$ is preferably greater than 270 degrees and less than 360 degrees as described below.

An angle formed by the line segment L and the tire lateral direction Y1, Y2 is preferably 10° or less, and more preferably parallel with the tire lateral direction Y1, Y2.

The protrusion portion 61A and the recessed portion 62A are preferably located at substantially identical positions in the tire lateral direction Y1, Y2. Specifically, an angle formed by a straight line that connects the corner A of the protrusion portion 61A and the corner B of the recessed portion 62A and the tire circumferential direction Z1, Z2 is preferably 10° or less, and more preferably parallel with the tire circumferential direction Z1, Z2.

The end portion of the protrusion portion side S1 in the Z2-direction and the end portion of the recessed portion side S3 in the Z2-direction are connected by the side S5. Additionally, the end portion of the protrusion portion side S2 in the Z2-direction and the end portion of the recessed portion side S4 in the Z2-direction are connected by the side S6. In the present embodiment, the sides S5, S6 are parallel with the tire lateral direction Y1, Y2.

The sides of the polygonal end surface 60a (protrusion portion sides S1, S2, recessed portion sides S3, S4, and sides S5, S6) are preferably straight line segments. However, the sides may curve giving the sides roundness. For example, the sides may be curved with a radius of curvature greater than the length of the end surface 60a in the tire lateral direction.

Corner portions of the end surface 60a are formed by joining together two adjacent sides at the end points to form an angle other than 180 degrees. However, the corner portions may be rounded instead of cornered. For example, the corner portions may be curved with a radius of curvature of equal to or less than 1/10 of the length of the shortest side of the end surface 60a.

When a vehicle is driven forward on icy road surfaces with low friction, the tire 10 may slip, and the tread surface moves in the Z1-direction relative to the icy road surface. In the present embodiment, by the protrusion portion 61A being provided in the end portion of the end surface 60a in the Z1-direction, when the tire 10 rotates in the Z1-direction relative to the icy road surface and grips, the protrusion portion 61A digs into the ice on the icy road surface, breaking it up. Accordingly, sufficient mechanical breaking effect against the ice on the icy road surface can be obtained, friction on the icy road surface can be increased, and driving performance can be increased by ensuring kickoff. To obtain sufficient mechanical breaking effect against the ice on the icy road surface, the interior angle $\theta_A$ of the protrusion portion 61A is more preferably 160 degrees of less.

The broken up ice broken up by the protrusion portion 61A is discharged outward in the tire lateral direction away from the protrusion portion 61A along the protrusion portion sides S1, S2. Thus, when the vehicle is driven forward, the broken up ice does not enter the recessed portion 62A, and broken up ice collected in the recessed portion 62A does not prevent kickoff.

For the broken up ice broken up by the protrusion portion 61A to be discharged outward in the tire lateral direction, the interior angle $\theta_A$ of the protrusion portion 61A is preferably 110 degrees or greater. Additionally, to promote discharge of the broken up ice in the tire lateral direction along the protrusion portion sides S1, S2, angles $\theta 1$, $\theta 2$ of the protrusion portion sides S1, S2 formed with the tire circumferential direction Z1, Z2 are preferably greater than 45 degrees.

Upon braking, the tread surface moves in the Z2-direction relatively to the road surface. Upon braking on icy road surfaces, broken up ice collects in the recessed portion 62A, and the broken up ice is immediately compacted by the side walls of the tip portion 60A including the recessed portion side S3 and the side wall of the tip portion 60A including the recessed portion side S4 and hardens. Upon braking on icy road surfaces, the sides S5, S6 of the end surface 60a and the hardened broken up ice at the line segment L come into contact with the ice on the icy road surface and dig into the ice. Thus, braking performance on ice can be increased. Upon braking on non-icy road surfaces, only the sides S5, S6 of the end surface 60a of the tip portion 60A come into contact with the road surface. Thus, wear of non-icy road surfaces can be reduced.

For the recessed portion sides S3, S4 to efficiently compact the broken up ice, angles $\theta 3$, $\theta 4$ formed by the pair of recessed portion sides S3, S4 and the tire circumferential direction Z1, Z2 are preferably greater than 0 degrees and less than 45 degrees, and a minor angle $\theta_B$ formed by the pair of recessed portion sides S3, S4 of the recessed portion 62A is preferably less than 90 degrees. In other words, the interior angle $(360°-\theta_B)$ of the recessed portion 62A is preferably $270°<(360°-\theta_B)<360°$. For the broken up ice to be reliably collected in the recessed portion 62A, the minor angle $\theta_B$ formed by the recessed portion sides S3, S4 is preferably greater than 60 degrees. In other words, the interior angle $(360°-\theta_B)$ of the recessed portion 62A is preferably less than 300°.

Additionally, by the recessed portion 62A being provided, the weight of the tip portion 60A can be reduced. As a result, the force acting on the road surface from the tip portion 60A can be reduced, and thus road surface wear can be reduced.

To obtain a sufficient effect of reducing the weight of the tip portion 60A, L1/L2 is preferably such that L1/L2≤5.0, and more preferably such that L1/L2≤3.0, where L1 is the distance from the corner A of the protrusion portion 61A to the corner B of the recessed portion 62A, and L2 is the distance from the corner B of the recessed portion 62A to the line segment L. For the recessed portion 62A to reliably compact the broken up ice, L1/L2 is preferably such that 1.0≤L1/L2, and more preferably such that 1.5≤L1/L2.

Note that in the embodiment described above, the tip portion 60A included the end surface 60a with six sides (protrusion portion sides S1, S2, recessed portion sides S3, S4, and sides S5, S6). However, no such limitation is intended for the present technology. Below, a modified example of the present embodiment will be described.

MODIFIED EXAMPLE 1

Figure 5:
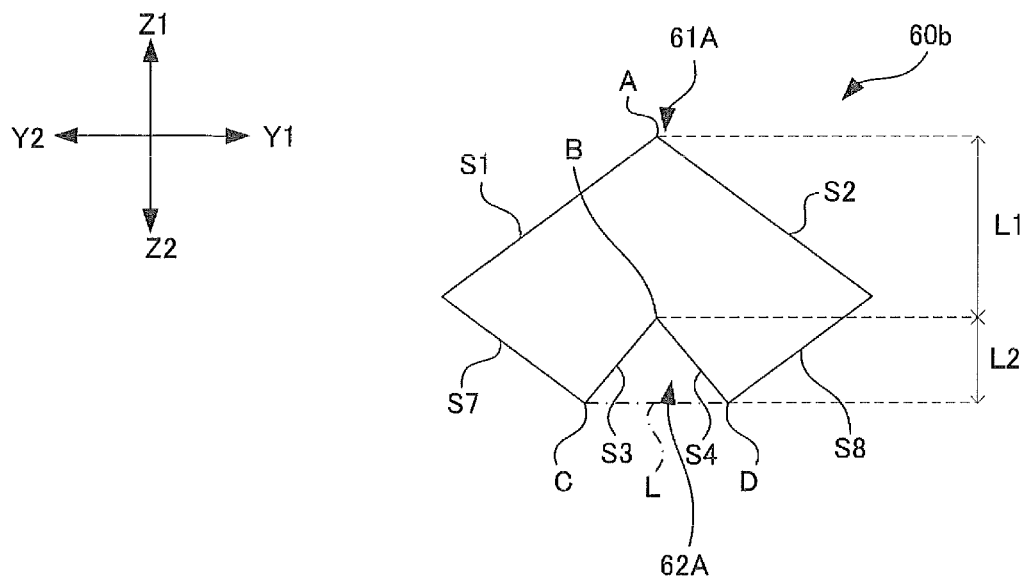
FIG. 5 is a plan view illustrating the shape of an end surface 60b.

FIG. 5 is a plan view illustrating an end surface 60b according to a first modified example of the present technology. In the end surface 60b according to the first modified example, the end portion of the protrusion portion side S1 in the Z2-direction and the end portion of the recessed portion side S3 in the Z2-direction are connected by a side S7. The side S7 extends from the end portion of the protrusion portion side S1 in the Z2-direction at an incline in the Y1-direction and the Z2-direction. Additionally, the end portion of the protrusion portion side S2 in the Z2-direction and the end portion of the recessed portion side S4 in the Z2-direction are connected by a side S8. The side S8 extends from the end portion of the protrusion portion side S2 in the Z2-direction at an incline in the Y2-direction and the Z2-direction. In such a manner, the profile shape of the end surface 60b is preferably a pentagon formed by five sides, namely the protrusion portion sides S1, S2, the sides S7, S8, and the line segment L with a triangular first recessed portion formed by the pair of recessed portion sides S3, S4 and the line segment L extracted.

In the first modified example also, upon braking on icy road surfaces, broken up ice collects in the recessed portion 62A, and the broken up ice is immediately compacted by the side walls of the tip portion 60A including the recessed portion side S3 and the side wall of the tip portion 60A including the recessed portion side S4 and hardens. Upon braking on icy road surfaces, the compacted broken up ice at the line segment L comes into contact with the ice on the icy road surface and digs into the ice. Thus, braking performance on ice can be increased. Upon braking on non-icy road surfaces, only the corners C, D come into contact with the road surface. Thus, wear of non-icy road surfaces can be reduced.

MODIFIED EXAMPLE 2

Figure 6:
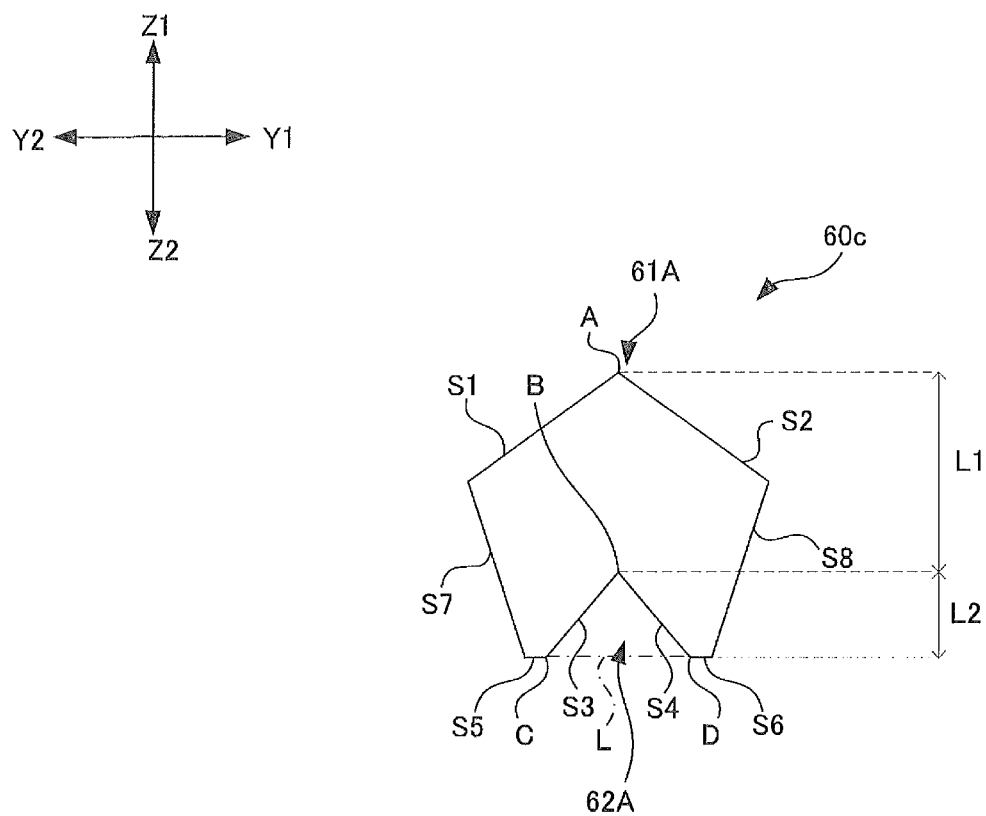
FIG. 6 is a plan view illustrating the shape of an end surface 60c.

FIG. 6 is a plan view illustrating an end surface 60c according to a second modified example of the present technology. As illustrated in FIG. 6, the profile shape of the end surface 60c is preferably a pentagon with the triangular first recessed portion formed by the pair of recessed portion sides S3, S4 and the line segment L extracted. In the end surface 60c according to the second modified example, the end portion of the protrusion portion side S1 in the Z2-direction and the end portion of the side S7 in the Z1-direction are connected, the end portion of the recessed portion side S3 in the Z2-direction and the end portion of the side S5 in the Y1-direction are connected, and the end portion of the side S7 in the Z2-direction and the end portion of the side S5 in the Y2-direction are connected. Additionally, the end portion of the protrusion portion side S2 in the Z2-direction and the end portion of the side S8 in the Z1-direction are connected, the end portion of the recessed portion side S4 in the Z2-direction and the end portion of the side S6 in the Y2-direction are connected, and the end portion of the side S8 in the Z2-direction and the end portion of the side S6 in the Y1-direction are connected.

The sides S5, S6 are parallel with the tire lateral direction Y1, Y2.

The side S7 extends from the end portion of the protrusion portion side S1 in the Z2-direction at an incline in the Y1-direction and the Z2-direction. The side S8 extends from the end portion of the protrusion portion side S2 in the Z2-direction at an incline in the Y2-direction and the Z2-direction.

In the second modified example also, upon braking on icy road surfaces, broken up ice collects in the recessed portion 62A, and the broken up ice is immediately compacted by the side walls of the tip portion 60A including the recessed portion side S3 and the side wall of the tip portion 60A including the recessed portion side S4 and hardens. Upon braking on icy road surfaces, the sides S5, S6 of the end surface 60a and the hardened broken up ice at the line segment L come into contact with the ice on the icy road surface and dig into the ice. Thus, braking performance on ice can be increased. Upon braking on non-icy road surfaces, only the sides S5, S6 of the end surface 60a of the tip portion 60A come into contact with the road surface. Thus, wear of non-icy road surfaces can be reduced.

MODIFIED EXAMPLE 3

Figure 7:
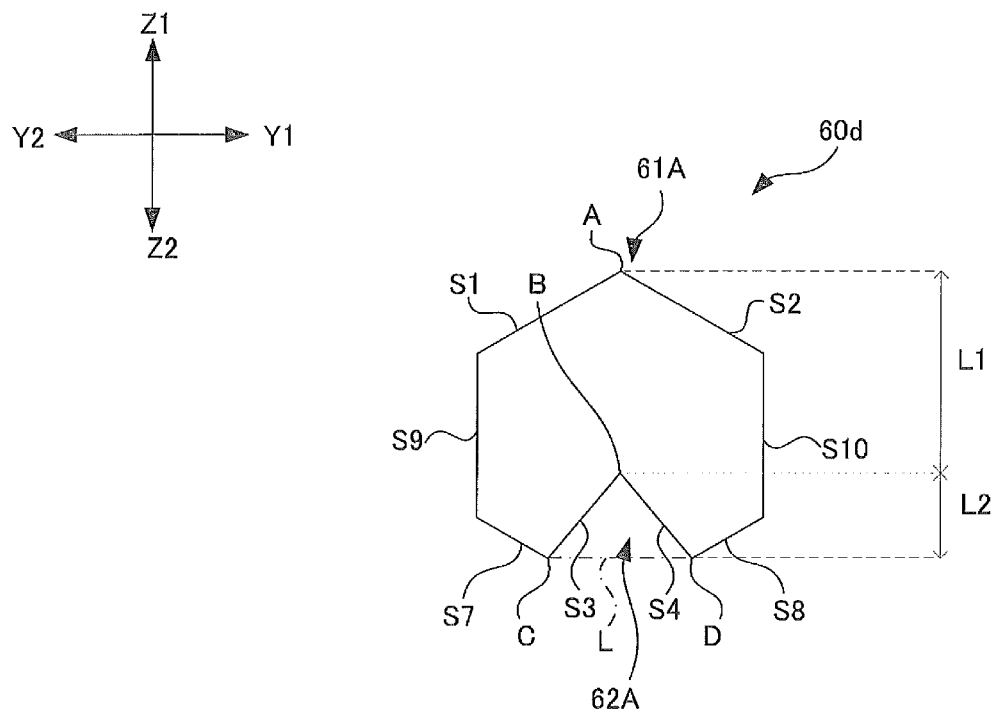
FIG. 7 is a plan view illustrating the shape of an end surface 60d.

FIG. 7 is a plan view illustrating an end surface 60d according to a third modified example of the present technology. As illustrated in FIG. 7, the profile shape of the end surface 60d is preferably a heptagon formed by seven sides, namely the protrusion portion sides S1, S2, the sides S7, S8, S9, S10, and the line segment L with a triangular first recessed portion formed by the pair of recessed portion sides S3, S4 and the line segment L extracted. In the end surface 60d, the end portion of the protrusion portion side S1 in the Z2-direction and the end portion of a side S9 in the Z1-direction are connected, the end portion of the side S9 in the Z2-direction and the end portion of the side S7 in the Z1-direction are connected, and the end portion of the side S7 in the Z2-direction and the end portion of the recessed portion side S3 in the Z2-direction are connected. Additionally, the end portion of the protrusion portion side S2 in the Z2-direction and the end portion of a side S10 in the Z1-direction are connected, the end portion of the side S10 in the Z2-direction and the end portion of the side S8 in the Z1-direction are connected, and the end portion of the side S8 in the Z2-direction and the end portion of the recessed portion side S4 in the Z2-direction are connected.

The sides S9, S10 are parallel with the tire circumferential direction Z1, Z2.

The side S7 extends from the end portion of the side S9 in the Z2-direction at an incline in the Y1-direction and the Z2-direction.

The side S8 extends from the end portion of the side S10 in the Z2-direction at an incline in the Y2-direction and the Z2-direction.

In the third modified example also, upon braking on icy road surfaces, broken up ice collects in the recessed portion 62A, and the broken up ice is immediately compacted by the side walls of the tip portion 60A including the recessed portion side S3 and the side wall of the tip portion 60A including the recessed portion side S4 and hardens. Upon braking on icy road surfaces, the compacted broken up ice at the line segment L comes into contact with the ice on the icy road surface and digs into the ice. Thus, braking performance on ice can be increased. Upon braking on non-icy road surfaces, only the corners C, D come into contact with the road surface. Thus, wear of non-icy road surfaces can be reduced.

Second Embodiment

Figure 8:
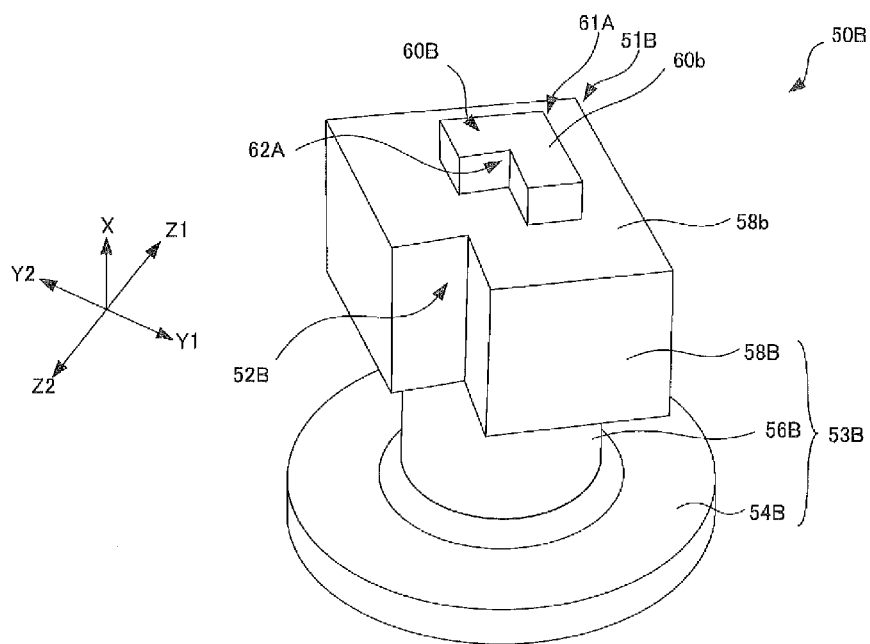
FIG. 8 is an external perspective view illustrating a stud pin 50B of the second embodiment of the present technology.

FIG. 8 is a perspective view illustrating a stud pin 50B according to a second embodiment of the present technology. In the stud pin 50B of the second embodiment, the end surface 60*b* of a tip portion 60B has a shape similar to that illustrated in FIG. 5. In other words, the end surface 60*b* is a hexagon with five protrusion portions and one recessed portion.

Additionally, a buried base portion 53B of the second embodiment has a shape different from that of the buried base portion 53A of the first embodiment. The buried base portion 53B of the stud pin 50B illustrated in FIG. 8 includes a bottom portion 54B, a shank portion 56B, and a body portion 58B. The bottom portion 54B, the shank portion 56B, and the body portion 58B are formed in this order in the X-direction.

In the present embodiment, an upper end surface 58*b* of the body portion 58B has a shape similar to that of the end surface 60*b* illustrated in FIG. 5. In other words, the upper end surface 58*b* is a hexagon with five protrusion portions and one recessed portion.

Figure 9:
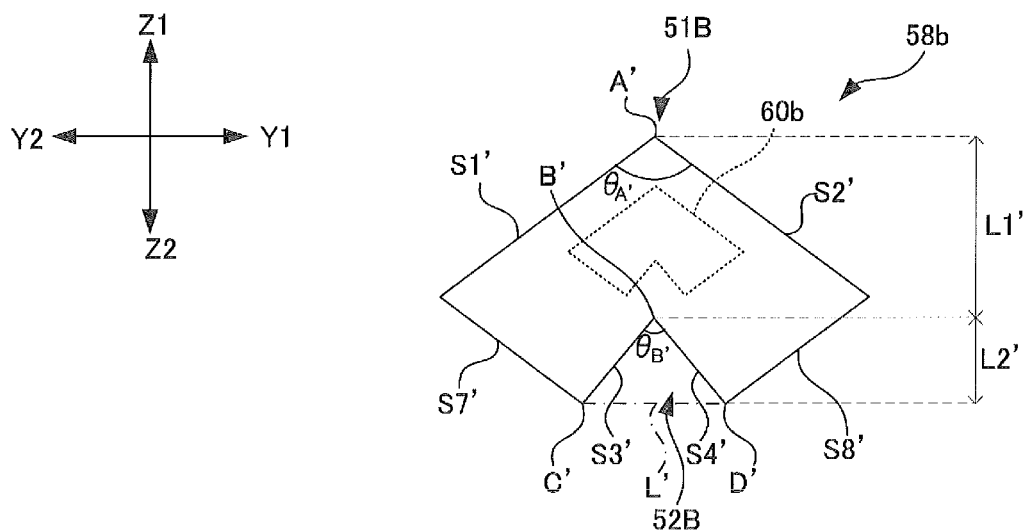
FIG. 9 is a plan view illustrating an upper end surface 58b of a tip portion 60B.

FIG. 9 is a plan view illustrating the upper end surface 58*b* of the tip portion 60B. The profile shape of the upper end surface 58*b* includes a pair of protrusion portion sides (second protrusion portion sides) S1', S2', and a pair of recessed portion sides (second recessed portion sides) S3', S4'.

The pair of protrusion portion sides S1', S2' are adjacent to one another and form a protrusion portion 51B (second protrusion portion) at the end portion of the upper end surface 58*b* in the Z1-direction. The protrusion portion side S extends from a corner A' of the protrusion portion 51B in the Y2-direction and the Z2-direction. The protrusion portion side S2' extends from the corner A' of the protrusion portion 51B in the Y1-direction and the Z2-direction. An interior angle $\theta_A'$ formed by the pair of protrusion portion sides S1', S2' at the protrusion portion 51B is less than 180 degrees. The interior angle $\theta_A'$ is preferably greater than 90 degrees.

The pair of recessed portion sides S3', S4' are adjacent to one another and form a recessed portion 52B (second recessed portion) at the end portion of the upper end surface 58*b* in the Z2-direction. The recessed portion 52B is a triangular region formed by a line segment L' that connects the end points of the pair of recessed portion sides S3', S4' in the Z2-direction (a line segment that connects a corner C', which is formed by the recessed portion side S3' and a side S7', and a corner D', which is formed by the recessed portion side S4' and a side S8') and the pair of recessed portion sides S3', S4'. The recessed portion side S3' extends from a corner B' of the recessed portion 62B in the Y2-direction and the Z2-direction. The recessed portion side S4' extends from the corner B' of the recessed portion 62B in the Y1-direction and the Z2-direction. An interior angle $(360°-\theta_B')$ formed by the pair of recessed portion sides S3', S4' of the recessed portion 52B is greater than 180 degrees. The interior angle $(360°-\theta_B')$ is preferably greater than 270 degrees and less than 360 degrees.

An angle formed by the line segment L' and the tire lateral direction Y1, Y2 is preferably 10° or less, and more preferably parallel with the tire lateral direction Y1, Y2.

The protrusion portion 51B and the recessed portion 52B are preferably located at substantially identical positions in the tire lateral direction Y1, Y2. In other words, an angle formed by a straight line that connects the corner A' of the protrusion portion 51B and the corner B' of the recessed portion 52B and the tire circumferential direction Z1, Z2 is preferably 10° or less, and more preferably parallel with the tire circumferential direction Z1, Z2.

The end portion of the protrusion portion side S1' in the Z2-direction and the end portion of the recessed portion side S3' in the Z2-direction are connected by the side S7'. The side S7' extends from the end portion of the protrusion portion side S1' in the Z2-direction at an incline in the Y1-direction and the Z2-direction. Additionally, the end portion of the protrusion portion side S2' in the Z2-direction and the end portion of the recessed portion side S4' in the Z2-direction are connected by the side S8'. The side S8' extends from the end portion of the protrusion portion side S2' in the Z2-direction at an incline in the Y2-direction and the Z2-direction.

The sides of the upper end surface 58*b* (protrusion portion sides S1', S2', recessed portion sides S3', S4', and sides S7', S8') are preferably straight line segments. However, the sides may curve giving the sides roundness. For example, the sides may be curved with a radius of curvature greater than the length of the upper end surface 58*b* in the tire lateral direction.

Corner portions of the upper end surface 58*b* are formed by joining together two adjacent sides at the end points to form an angle other than 180 degrees. However, the corner portions may have roundness. For example, the corner portions may be curved with a radius of curvature of equal to or less than 1/10 of the length of the shortest side of the upper end surface 58*b*.

In the present embodiment, the recessed portion 52B is formed in the body portion 58B as well as the tip portion 60B. As a result, the weight of the stud pin 50B can be reduced and the wear of non-icy road surface can be reduced. Upon braking on icy road surfaces, broken up ice collects in the recessed portion 52B, and the broken up ice is immediately compacted by the side walls of the body portion 58B including the recessed portion side S3' and the side wall of the body portion 58B including the recessed portion side S4' and hardens. Upon braking on icy road surfaces, the hardened broken up ice at the line segment L' comes into contact with the ice on the icy road surface and digs into the ice. Thus, braking performance on ice can be increased. For the recessed portion sides S3', S4' to efficiently compact the broken up ice, a minor angle $\theta_B'$ formed by the pair of recessed portion sides S3', S4' of the recessed portion 52B is preferably less than 90 degrees. In other words, the interior angle $(360°-\theta_B')$ of the recessed portion 52B is preferably $270°<(360°-\theta_B')<360°$. For the broken up ice to be reliably collected in the recessed portion 52B, the minor angle $\theta_B'$ formed by the recessed portion sides S3', S4' is preferably greater than 60 degrees. In other words, the interior angle $(360°-\theta_B')$ of the recessed portion 52B is preferably less than 300°.

To obtain a sufficient effect of reducing the weight of the body portion 58B, L1'/L2'≤5.0 is preferable, and L1'/L2'≤3.0 is more preferable, where L1' is the distance from the corner A' of the protrusion portion 51B to the corner B' of the recessed portion 52B, and L2' is the distance from the corner B' of the recessed portion 52B to the line segment L'. For the recessed portion 52B to reliably compact the broken up ice, 1.0≤L1'/L2' is preferable, and 1.5≤L1'/L2' is more preferable.

Note that in the embodiment described above, the body portion 58B includes an upper end surface with a shape similar to that of the end surface 60*b* illustrated in FIG. 5.

However, the shape of the body portion formed with a recessed portion is not limited thereto. For example, the body portion may have an upper end surface with a shape similar to that of the end surfaces 60a, 60c, 60d illustrated in FIGS. 4, 6, and 7. Additionally, the upper end surface of the body portion and the end surface of the tip portion are not required to have similar shapes, and how the shapes of the end surface and the body portion are combined is discretionary.

MODIFIED EXAMPLE 4

Figure 10:
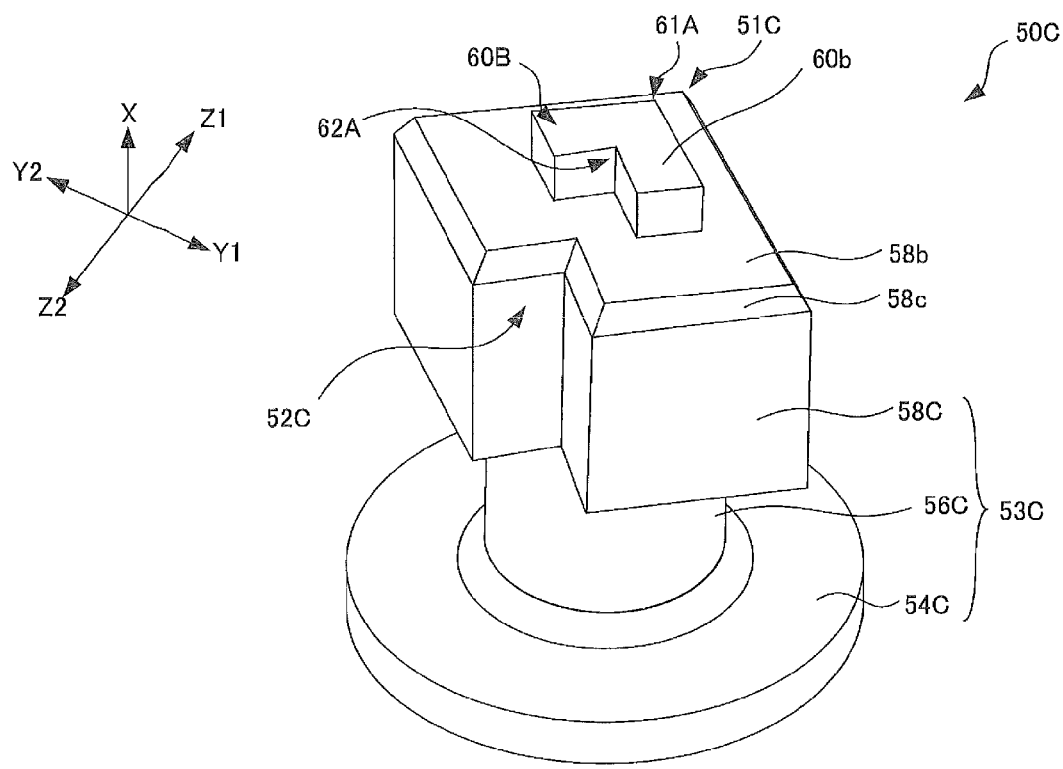
FIG. 10 is an external perspective view illustrating a stud pin 50C according to a modified example of the second embodiment.

FIG. 10 is an external perspective view illustrating a stud pin 50C according to a modified example of the second embodiment. As illustrated in FIG. 10, a chamfered surface 58c is provided along the profile line of the upper end surface 58b of a body portion 58C. The body portion 58C comes into contact with the road surface with the stud pin in an inclined state. As illustrated in FIG. 8, in an embodiment without the chamfered surface 58c, the body portion 58B comes into contact with the road surface at the upper end surface 58b. However, as illustrated in FIG. 10, in an embodiment provided with the chamfered surface 58c, the body portion 58C comes into contact with the road surface at the chamfered surface 58c. By the chamfered surface 58c being provided, the contact area between the body portion 58C and the road surface is increased. Thus, the driving performance and braking performance can be increased. An angle formed by the chamfered surface 58c and the upper end surface 58b preferably ranges from 110° to 160°, and more preferably from 120° to 150°.

MODIFIED EXAMPLE 5

Figure 11:
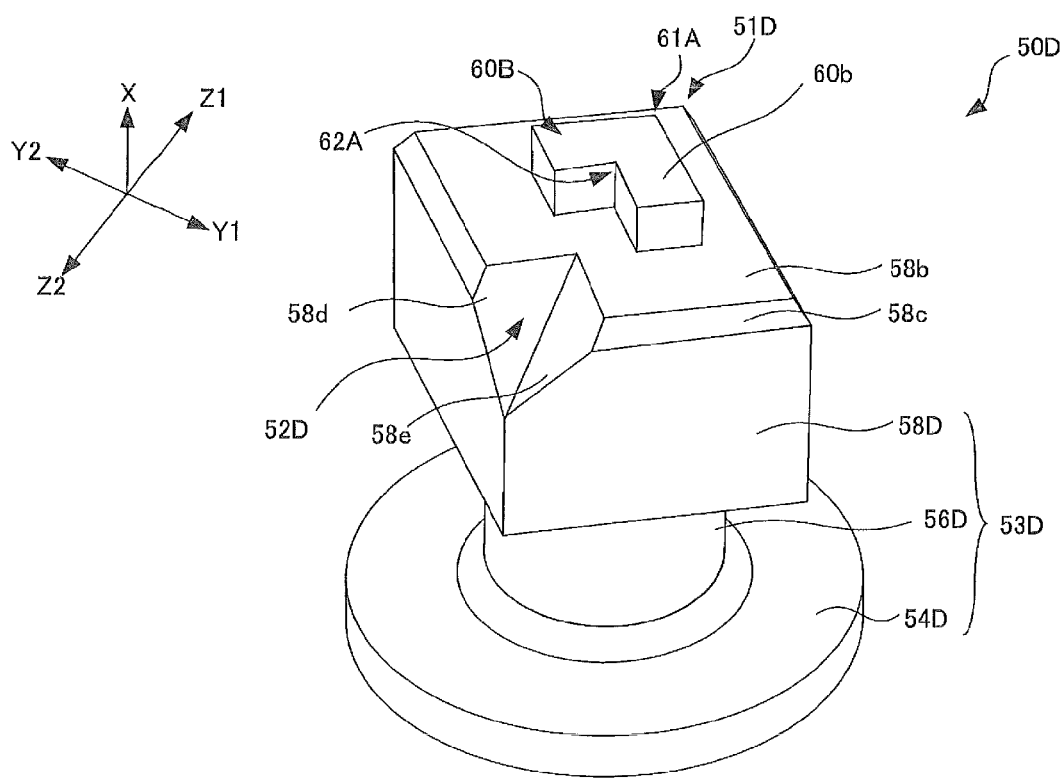
FIG. 11 is an external perspective view illustrating a stud pin 50D according to a modified example of the second embodiment.

FIG. 11 is an external perspective view illustrating a stud pin 50D according to a modified example of the second embodiment. As illustrated in FIG. 11, a recessed portion 52D provided in a body portion 58D is not required to extend the entire length of the body portion 58D in the X-direction and may extend the length from the upper end surface 58b to partway toward a shank portion 56D (for example, half the entire length of the body portion 58D in the X-direction). In FIG. 11, the side surfaces at the portion where the recessed portion 52D is formed in the body portion 58D are inclined surfaces 58d, 58e, which are inclined with respect to the X-direction. An angle formed by the inclined surfaces 58d, 58e that form the recessed portion 52D and the upper end surface 58b preferably ranges from 110° to 160°, and more preferably from 120° to 150°.

In the present embodiment also, by the recessed portion 52D being formed, the weight of the stud pin 50D can be reduced and the wear of non-icy road surface can be reduced. Upon braking on icy road surfaces, broken up ice collects in the recessed portion 52D, and the broken up ice is immediately compacted by the inclined surface 58d including the recessed portion side S3' and the inclined surface 58e including the recessed portion side S4' and hardens. Upon braking on icy road surfaces, the hardened broken up ice comes into contact with the ice on the icy road surface and digs into the ice. Thus, braking performance on ice can be increased. Note that in FIG. 11, the chamfered surface 58c is provided on the body portion 58D; however, the chamfered surface 58c may also not be provided on the body portion 58D.

EXAMPLES

To test the effects of the stud pins of the embodiments, stud pins of Examples 1 to 26 and a comparative example were installed in tires similar to the tire 10 illustrated in FIG. 1. The tire size of the tires was 205/55R16.

In Examples 1 to 26, a tip portion including an end surface with a shape similar to that of the end surface 60a illustrated in FIG. 5 was used. The interior angle $\theta_A$ of the protrusion portion, the minor angle $\theta_B$ formed by the pair of recessed portion sides, and L1/L2 were set as indicated in Tables 1 to 4.

In the comparative example, the shape of the end surface was a rhomboid, and a tip portion without a recessed portion was used. The length of the four sides of the rhomboid was identical to the length of the protrusion portion side of Example 1. Additionally, one of the interior angles of the rhomboid was identical to the interior angle of the protrusion portion of Example 1.

In Examples 1 to 19 and the comparative example, a buried base portion similar to the buried base portion 53A illustrated in FIG. 2 was used.

In Examples 20 to 25, a buried base portion similar to the buried base portion 53B illustrated in FIG. 8 was used. The minor angle $\theta_B'$ formed by the pair of recessed portion sides of the buried base portion was set as indicated in Table 4.

In Example 26, a buried base portion similar to the buried base portion 53C illustrated in FIG. 10 was used. The angle of the chamfered surface with respect to the length direction was 45°.

The stud pins described above were mounted in the stud pin installation holes with the recessed portion facing the trailing side and the protrusion portion on the side opposite the recessed portion facing the leading side in the tire circumferential direction.

Tires of the examples and comparative example described above were mounted on a passenger vehicle and evaluated for braking performance on ice and amount of road surface wear. The passenger vehicle used was a front-wheel drive sedan with an engine displacement of 2000 cc. The internal pressure condition of the tires was 230 kPa for both the front wheels and rear wheels. The tire size was 205/55R16. The load condition of the tires was a 450 kg load on the front wheels and a 300 kg load on the rear wheels.

Braking Performance on Ice

For evaluation, the reciprocal of the braking distance obtained from running the passenger vehicle described above on a test course with an icy road surface was used, and these were expressed as index values with the value of the comparative example defined as 100. Larger values indicate higher performance.

Amount of Road Surface Wear

Granite was embedded in a road surface, and the passenger vehicle described above was driven over the granite. The difference in weight of the granite before and after was measured and taken as the amount of wear. For evaluation, the reciprocal of the measurement values was used, and these were expressed as index values with the value of the comparative example being defined as 100. Larger values indicate higher performance.

The results are indicated in Tables 1 to 4.

TABLE 1-1

|  | Comparative Example | Example 1 | Example 2 | Example 3 |
| --- | --- | --- | --- | --- |
| $\theta_A$ | 80 | 80 | 90 | 100 |
| $\theta_B$ | — | 80 | 80 | 80 |

TABLE 1-1-continued

|  | Comparative Example | Example 1 | Example 2 | Example 3 |
|---|---|---|---|---|
| L1/L2 | — | 2 | 2 | 2 |
| Braking performance on ice | 100 | 103 | 104 | 105 |
| Amount of road surface wear | 100 | 102 | 104 | 104 |

TABLE 1-2

|  | Example 4 | Example 5 | Example 6 | Example 7 |
|---|---|---|---|---|
| $\theta_A$ | 110 | 130 | 160 | 170 |
| $\theta_B$ | 80 | 80 | 80 | 80 |
| L1/L2 | 2 | 2 | 2 | 2 |
| Braking performance on ice | 106 | 108 | 106 | 104 |
| Amount of road surface wear | 105 | 105 | 105 | 102 |

As seen from comparing the comparative example and Example 1, by the stud pin with a recessed portion formed in the tip portion being installed in the tire with the recessed portion facing the trailing side in the tire circumferential direction, the braking performance on ice was increased and the amount of road surface wear was reduced.

As seen from comparing Examples 1 to 7, by the interior angle $\theta_A$ of the protrusion portion being greater than 90 degrees, the braking performance on ice was increased and the amount of road surface wear was reduced. In particular, by $\theta_A$ ranging from 110 degrees to 160 degrees, the braking performance on ice was further increased and the amount of road surface wear was further reduced.

As seen from comparing Examples 8 to 13, by the interior angle of the recessed portion of the tip portion ranging from 60 degrees to 90 degrees, the amount of road surface wear can be reduced without a significant reduction in the braking performance on ice.

As seen from comparing Examples 14 to 19, by L1/L2 being set such that 1≤L1/L2≤5, the amount of road surface wear can be reduced while the braking performance on ice is maintained.

TABLE 2

|  | Example 8 | Example 9 | Example 10 | Example 11 | Example 12 | Example 13 |
|---|---|---|---|---|---|---|
| $\theta_A$ | 120 | 120 | 120 | 120 | 120 | 120 |
| $\theta_B$ | 50 | 60 | 70 | 80 | 90 | 100 |
| L1/L2 | 2 | 2 | 2 | 2 | 2 | 2 |
| Braking performance on ice | 105 | 108 | 109 | 108 | 108 | 106 |
| Amount of road surface wear | 104 | 106 | 108 | 108 | 107 | 104 |

TABLE 3

|  | Example 14 | Example 15 | Example 16 | Example 17 | Example 18 | Example 19 |
|---|---|---|---|---|---|---|
| $\theta_A$ | 120 | 120 | 120 | 120 | 120 | 120 |
| $\theta_B$ | 80 | 80 | 80 | 80 | 80 | 80 |
| L1/L2 | 0.5 | 1 | 1.5 | 3 | 5 | 6 |
| Braking performance on ice | 101 | 104 | 105 | 107 | 108 | 108 |
| Amount of road surface wear | 110 | 109 | 108 | 105 | 104 | 102 |

TABLE 4

|  | Example 20 | Example 21 | Example 22 | Example 23 | Example 24 | Example 25 | Example 26 |
|---|---|---|---|---|---|---|---|
| $\theta_A$ | 120 | 120 | 120 | 120 | 120 | 120 | 120 |
| $\theta_B$ | 80 | 80 | 80 | 80 | 80 | 80 | 80 |
| L1/L2 | 2 | 2 | 2 | 2 | 2 | 2 | 2 |
| $\theta_B'$ | 50 | 60 | 70 | 80 | 90 | 100 | 80 |
| Chamfered buried base portion | No | No | No | No | No | No | Yes |
| Braking performance on ice | 110 | 113 | 114 | 113 | 113 | 111 | 115 |
| Amount of road surface wear | 109 | 111 | 112 | 112 | 111 | 109 | 111 |

As seen from comparing Example 11 and Examples 20 to 25, by the recessed portion being provided also in the buried base portion, the braking performance on ice can be further increased.

As seen from comparing Examples 20 to 25, by the interior angle (360°−$\theta_B'$) of the recessed portion of the buried base portion being greater than 270 degrees, the amount of road surface wear can be reduced without a significant reduction in the braking performance on ice.

As seen from comparing Examples 23 and 26, by the chamfered surface being provided on the buried base portion, the braking performance on ice can be increased.

The foregoing has been a detailed description of the stud pin and pneumatic tire of the present technology. However, the pneumatic tire of the present technology is not limited to the above embodiments, and may be enhanced or modified in various ways within the scope of the present technology.

The invention claimed is:

1. A stud pin mountable in a stud pin installation hole of a tread portion of a pneumatic tire, the stud pin comprising:
   a buried base portion configured to be embedded in the stud pin installation hole that extends in a tire radial direction; and
   a tip portion configured to project from a road contact surface of the tread portion when the buried base portion is embedded in the stud pin installation hole,
   the tip portion comprising an end surface with a concave polygonal profile shape comprising one first recessed portion and one first protrusion portion on a side opposite the first recessed portion, the first recessed portion formed by adjacent pair of first recessed portion sides, the pair of first recessed portion sides extending straightly;
   a pair of first protrusion portion sides that form the first protrusion portion;
   a pair of lateral sides that are provided on outermost positions of the concave polygonal profile shape in a lateral direction perpendicular to a rear direction directing from a corner of the first protrusion portion toward a corner of the first recessed portion; and
   a pair of inclined sides that extend in the rear direction and inward in the lateral direction from ends of the pair of lateral sides, the pair of inclined sides being parallel to one of the pair of first protrusion portion sides respectively.

2. The stud pin according to claim 1, wherein
   $1.0 \leq L1/L2 \leq 5.0$ is satisfied,
   where L1 is a distance from a corner of the first protrusion portion to a corner of the first recessed portion, and L2 is a distance from a straight line that connects end points of the pair of first recessed portion sides on a side opposite the corner of the first recessed portion to the corner of the first recessed portion.

3. The stud pin according to claim 1, wherein
   an end surface of the buried base portion where the tip portion is provided has a concave polygonal profile shape comprising one second recessed portion and one second protrusion portion on a side opposite the second recessed portion; and
   the second protrusion portion faces a leading side in a tire circumferential direction and the second recessed portion faces a trailing side.

4. The stud pin according to claim 3, wherein
   the second recessed portion is formed by an adjacent pair of second recessed portion sides; and
   $1.0 \leq L1'/L2' \leq 5.0$ is satisfied,
   where L1' is a distance from a corner of the second protrusion portion to a corner of the second recessed portion, and L2' is a distance from a straight line that connects end points of the pair of second recessed portion sides on a side opposite the corner of the second recessed portion to the corner of the second recessed portion.

5. A stud pin mountable in a stud pin installation hole of a tread portion of a pneumatic tire, the stud pin comprising:
   a buried base portion configured to be embedded in the stud pin installation hole that extends in a tire radial direction; and
   a tip portion configured to project from a road contact surface of the tread portion when the buried base portion is embedded in the stud pin installation hole,
   the tip portion comprising an end surface with a concave octagonal profile shape comprising one first recessed portion and seven protrusion portions that include one first protrusion portion on a side opposite the first recessed portion;
   a pair of first protrusion portion sides that form the first protrusion portion;
   a pair of lateral protrusion portions or a pair of lateral sides that are provided on outermost positions of the concave octagonal profile shape in a lateral direction perpendicular to a rear direction directing from a corner of the first protrusion portion toward a corner of the first recessed portion; and
   a pair of inclined sides that extend in the rear direction and inward in the lateral direction from corners of the pair of lateral protrusion portions or ends of the pair of lateral sides, the pair of inclined sides being parallel to one of the pair of first protrusion portion sides respectively.

6. The stud pin according to claim 5, wherein
   the first recessed portion is formed by an adjacent pair of first recessed portion sides; and
   $1.0 \leq L1/L2 \leq 5.0$ is satisfied,
   where L1 is a distance from a corner of the first protrusion portion to a corner of the first recessed portion, and L2 is a distance from a straight line that connects end points of the pair of first recessed portion sides on a side opposite the corner of the first recessed portion to the corner of the first recessed portion.

7. The stud pin according to claim 5, wherein
   an end surface of the buried base portion where the tip portion is provided has a concave octagonal profile shape comprising one second recessed portion and one second protrusion portion on a side opposite the second recessed portion; and
   the second protrusion portion faces a leading side in a tire circumferential direction and the second recessed portion faces a trailing side.

8. The stud pin according to claim 7, wherein
   the second recessed portion is formed by an adjacent pair of second recessed portion sides; and
   $1.0 \leq L1'/L2' \leq 5.0$ is satisfied,
   where L1' is a distance from a corner of the second protrusion portion to a corner of the second recessed portion, and L2' is a distance from a straight line that connects end points of the pair of second recessed portion sides on a side opposite the corner of the second recessed portion to the corner of the second recessed portion.

9. The stud pin according to claim 5, wherein the concave octagonal profile shape includes a pair of rear protrusion portions that protrude in the rear direction directing from a corner of the first protrusion portion to a corner of the first recessed portion, and that have corners located away from the lateral sides inside a region between the lateral sides.

10. The stud pin according to claim 5, wherein one of the pair of inclined sides and one of the pair of first protrusion portion sides that is parallel to the one of the pair of inclined sides are located on opposite sides, in the lateral direction, of a line connected between a corner of the first protrusion portion and a corner of the first recessed portion each other.

11. The stud pin according to claim 5, wherein the pair of lateral sides are in parallel to each other.

12. A pneumatic tire with a designated rotation direction, comprising:
    a stud pin mounted in a stud pin installation hole of a tread portion;
    the stud pin comprising:
    a buried base portion embedded in the stud pin installation hole that extends in a tire radial direction; and
    a tip portion that projects from a road contact surface of the tread portion when the buried base portion is embedded in the stud pin installation hole,
    the tip portion comprising an end surface with a concave octagonal profile shape, the concave octagonal profile shape comprising:
        one first recessed portion;
        one first protrusion portion on a side opposite the first recessed portion;
        a pair of first protrusion portion sides that form the first protrusion portion;
        a pair of lateral protrusion portions or a pair of lateral sides that are provided on outer most positions of the concave octagonal profile shape in a lateral direction perpendicular to a rear direction directing from a corner of the first protrusion portion toward a corner of the first recessed portion; and
        a pair of inclined sides that extend in the rear direction and inward in the lateral direction from corners of the pair of lateral protrusion portions or ends of the pair of lateral sides, the pair of inclined sides being in parallel to one of the pair of first protrusion portion sides respectively; and
    the stud pin being disposed with the first protrusion portion facing a leading side in a tire circumferential direction and the first recessed portion facing a trailing side.

13. The pneumatic tire according to claim 12, wherein
the first recessed portion is formed by an adjacent pair of first recessed portion sides; and
$1.0 \leq L1/L2 \leq 5.0$ is satisfied,
where L1 is a distance from a corner of the first protrusion portion to a corner of the first recessed portion, and L2 is a distance from a straight line that connects end points of the pair of first recessed portion sides on a side opposite the corner of the first recessed portion to the corner of the first recessed portion.

14. The pneumatic tire according to claim 12, wherein
an end surface of the buried base portion where the tip portion is provided has a concave octagonal profile shape comprising one second recessed portion and one second protrusion portion on a side opposite the second recessed portion; and
the stud pin is disposed with the second protrusion portion facing the leading side in the tire circumferential direction and the second recessed portion facing the trailing side.

15. The pneumatic tire according to claim 14, wherein
the second recessed portion is formed by an adjacent pair of second recessed portion sides; and
$1.0 \leq L1'/L2' \leq 5.0$ is satisfied,
where L1' is a distance from a corner of the second protrusion portion to a corner of the second recessed portion, and L2' is a distance from a straight line that connects end points of the pair of second recessed portion sides on a side opposite the corner of the second recessed portion to the corner of the second recessed portion.

16. The pneumatic tire according to claim 12, wherein the concave octagonal profile shape includes a pair of rear protrusion portions that protrude in the rear direction directing from a corner of the first protrusion portion to a corner of the first recessed portion, and that have corners located away from the lateral sides inside a region between the lateral sides.

17. The pneumatic tire according to claim 12, wherein one of the pair of inclined sides and one of the pair of first protrusion portion sides that is parallel to the one of the pair of inclined sides are located on opposite sides, in the lateral direction, of a line connected between a corner of the first protrusion portion and a corner of the first recessed portion each other.

18. The pneumatic tire according to claim 12, wherein the pair of lateral sides are in parallel to each other.

* * * * *